United States Patent Office 3,755,605
Patented Aug. 28, 1973

3,755,605
DIPHENYLAMINE DERIVATIVES
George G. I. Moore, Birchwood, and Joseph Kenneth Harrington, Edina, Minn., assignors to Riker Laboratories, Inc., Northridge, Calif.
No Drawing. Continuation-in-part of abandoned application Ser. No. 28,082, Apr. 13, 1970. This application June 13, 1972, Ser. No. 262,302
Int. Cl. A61k 27/00
U.S. Cl. 424—321                10 Claims

ABSTRACT OF THE DISCLOSURE

Diphenylamines substituted by haloalkylsulfonamido groups and optionally substituted by other groups on the phenyl rings. These compounds and their salts are active anti-microbial agents and some are useful as anti-inflammatory agents, analgesics and herbicides.

This is a continuation-in-part of application Ser. No. 28,082, filed Apr. 13, 1970, now abandoned.

This invention relates to diphenylamines substituted by a haloalkylsulfonamido group, and optionally substituted by other groups on the phenyl rings and to salts thereof. These compounds are active anti-microbial agents and some are also active as anti-inflammatory agents, analgesics and herbicides.

It is an object of the invention to provide compounds for the control of microbes, e.g., fungi and bacteria (both gram-positive and gram-negative).

It is another object of the invention to provide compounds which are anti-inflammatory agents.

It is another object of the invention to provide compounds which modify the growth of plants, i.e., which prevent, alter, destroy or otherwise affect the growth of plants.

It is another object of the invention to provide compounds which act as analgesics.

It is a further object of the invention to provide a method for controlling micro-organisms.

It is a further object of the invention to provide a method for controlling inflammation in mammalian tissue.

It is a further object of the invention to provide a method for controlling unwanted plants.

It is a further object of the invention to provide a method for controlling pain.

It is still another object of the invention to provide anti-microbial compositions containing one or more haloalkylsulfonamido-substituted diphenylamines as active ingredients therein.

It is still another object of the invention to provide anti-inflammatory compositions containing one or more haloalkylsulfoamido-substituted diphenylamines as active ingredients therein.

It is still another object of the invention to provide herbicidal compositions containing one or more haloalkylsulfonamido-substituted diphenylamines as active ingredients therein.

It is still another object of the invention to provide analgesic compositions containing one or more haloalkylsulfonamido-substituted diphenylamines as active ingredients therein.

Still other objects will be made apparent by the following specification.

DETAILED DESCRIPTION

According to the present invention, there is provided a class of compounds consisting of substituted diphenyl amine compounds of the formula:

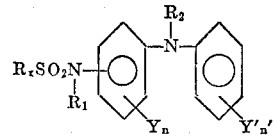

(I)

wherein $R_x$ is lower haloalkyl, $R_1$ is hydrogen or a microbiologically or agriculturally acceptable cation, $R_2$ is hydrogen or lower alkyl, $Y$ and $Y'$ are independently selected from the group consisting of lower alkyl, lower alkoxy, lower haloalkyl, lower alkoxycarbonyl and halogen and $n$ and $n'$ are independently zero, one or two.

The term lower when applied to substituent groups (radicals) of this invention, such as alkyl, alkoxy, alkoxycarbonyl and haloalkyl, refers to groups containing one to about four carbon atoms. When $n$ is zero, the ring adjacent to the perfluoroalkylsulfonamido group is unsubstituted except for that group and the phenyl amine group shown in the formula. Similarly, when $n'$ is zero, the second ring is unsubstituted except for the group shown in the formula and attached thereto through the amine nitrogen.

$R_x$ can be perhaloalkyl or partially halogenated alkyl, and the halogens can be mixed in either case. Such modification of the halogenated moiety $R_x$ has not been found to remove anti-microbial activity of the compounds of the invention, but it has been found to change other activities of compounds of the invention. The halogens present are preferably fluorine or chlorine, although bromine and iodine may also be present. It is preferred that at least one halogen is bonded to the alpha carbon atom or at least two halogens are bonded to the beta carbon atom. Compounds wherein $R_x$ is trifluoromethyl are most preferred. Preferably, also, $R_2$ is hydrogen.

A subgroup of the compounds which are preferred as active anti-inflammatory agents are those in which $n$ and $n'$ are both zero. Particularly preferred as anti-inflammatory agents are the compounds of the formula

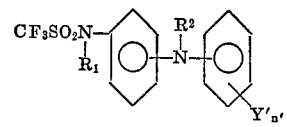

wherein $R_1$ is hydrogen or a pharmaceutically acceptable cation, $R_2$ and $Y'$ are as previously defined and $n'$ is 0–1.

The compounds of the invention which are in the acid form, i.e. compounds of Formula I in which $R_1$ is hydrogen, form salts i.e., wherein $R_1$ is a pharmaceutically or microbiologically acceptable cation. These are generally metal, ammonium and organic amine salts and can be prepared by treating the acid form with a stoichiometrically equivalent amount of an appropriate base under mild conditions. Among the metal salts of the invention are alkali metal (e.g., lithium, sodium and potassium), alkaline earth metal (e.g., barium, calcium and magnesium) and heavy metal (e.g., zinc and iron) salts as well as other metal salts such as aluminum. Appropriate bases for use in preparing the metal salts include metal oxides, hydroxides, carbonates, bicarbonates and alkoxides. Some salts are also prepared by cation exchange reactions (by reacting a salt of the invention with an organic or inorganic salt in a cation exchange reaction). The organic amine salts include the salts of alkylamines and aromatic amines, primary, secondary or tertiary. These and the ammonium salts can be prepared by reacting the acid form with the appropriate organic base or ammonium hydroxide. The pharmaceutically acceptable salts are generally the alkali metal, alkaline earth, ammonium and amine salts. Preferred among the pharmaceutically acceptable salts are those in which $R_1$ is an amine cation.

Any of the salts of the types set out above are microbiologically and agriculturally acceptable, the one chosen depending upon the particular use and upon the economics of the situation.

The salts of the invention are frequently formed by reacting the precursors in aqueous solution. This solution can be evaporated to obtain the salt of the compound, usually as a dry powder. In some cases, it may be more convenient to use a non-aqueous solvent such as alcohols, acetone, etc. The resulting solution is then treated to remove the solvent, for example by evaporation under reduced pressure. Since many of the salts are water soluble, they are often used in the form of aqueous solutions. Also, they can be used in making pharmaceutical preparations in the form of capsules for oral administration.

Due to the acidity of the hydrogen of the sulfonamido group of Formula I, some of the compounds of Formula I (i.e. those in which $R_x$ is perfluorinated) are also catalysts for certain acid-catalyzed polymerizations, e.g., polymerization of epoxides.

To produce the compounds of Formula I wherein $R_1$ is hydrogen, an aminodiphenylamine is condensed with a halo-alkylsulfonyl halide or anhydride according to the following equation:

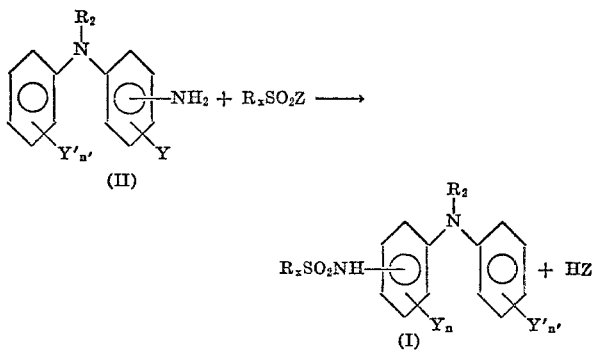

wherein $R_x$, $R_2$, Y, Y', $n$ and $n'$ are as previously defined and Z represents a halogen atom, preferably chlorine or fluorine or the corresponding alkane sulfonate grouping $—OSO_2R_x$.

Approximately equivalent amounts of the reactants are brought together at temperatures most often ranging between about $-15$ and $150°$ C. If necessary or desirable, the reaction can be carried out in a pressure vessel. Preferably, but not necessarily, an acid acceptor such as the alkali or alkaline earth metal carbonates and bicarbonates or a tertiary amine such as pyridine, triethylamine or N,N-dimethylaniline is utilized. The amount of the acid acceptor can be varied widely; however, a 10 mole percent excess of that amount of base sufficient to bind the liberated strong acid (HZ) is routinely employed.

The condensation is also usually conducted in the presence of an appropriate inert organic solvent. Typical solvents suitable for this purpose are methylene chloride, chloroform, carbon tetrachloride, benzene, toluene, 1,2-dimethoxyethane, bis (2-methoxyethyl)ether, acetonitrile, nitromethane, N,N-dimethylformamide and the like.

After reaction is complete, the product mixture can be extracted with a dilute aqueous base solution. The product, in the form of a salt which is usually soluble in the aqueous layer, is precipitated therefrom by addition of a mineral acid such as hydrochloric or sulfuric acid, and collected by filtration. The compounds prepared according to the foregoing procedures are solids purified, in general, by column chromatography, although sometimes, by recrystallization from aqueous alcohol, trichloroethylene, hexane, benzene-hexane mixtures and the like.

Alternatively the product may be recovered by removal of the solvent in vacuo, or by dilution with water, acidification and filtration.

Suitable haloalkylsulfonyl halides and anhydrides for use as starting materials in these procedures are known to the art, for example those described in U.S. Pat. 2,732,398, in the Journal of the Chemical Society (London) 3058 (1960) and elsewhere.

The aminodiphenylamines used in producing the compounds of the invention are described in the general chemical literature or can be easily prepared from corresponding known nitrodiphenylamines by reduction or by other well-known synthetic techniques.

The 3-nitrodiphenylamines are generally prepared by one of the known reaction sequences shown below, starting with prior art compounds:

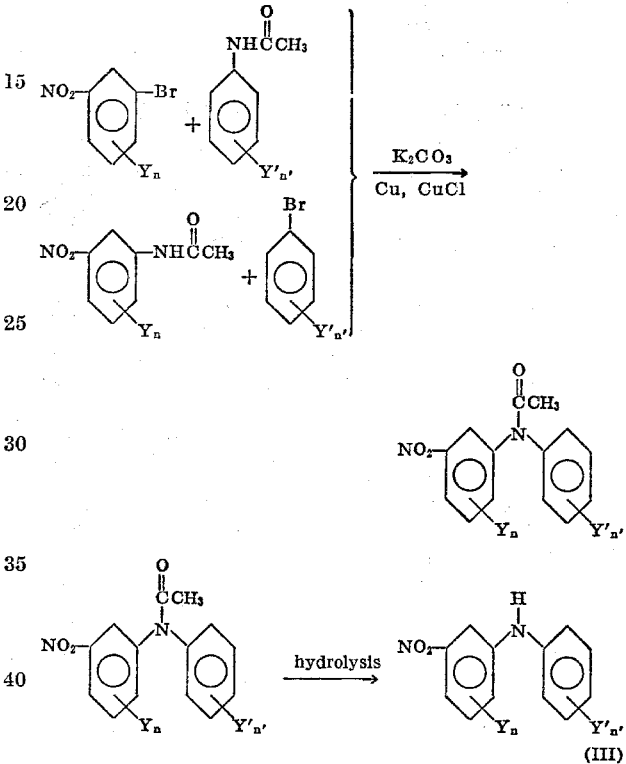

Alternatively the 3-bromonitrobenzene can be reacted with the aniline directly to form 3-nitrodiphenylamines, although this is generally a less preferred method.

The 2- and 4-nitrodiphenylamines are generally prepared by one of the above reaction sequences, or by reacting a corresponding 2- or 4-chloronitrobenzene with an aminobenzene by one of the known reaction sequences shown below, again starting with prior art compounds:

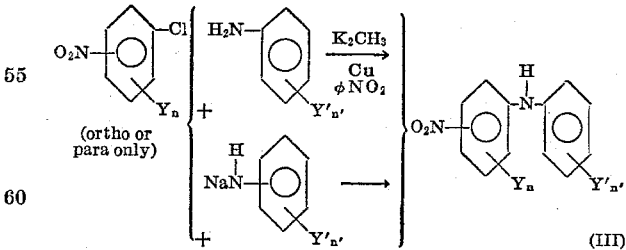

Aminodiphenylamines are readily prepared by the reduction of the corresponding nitrodiphenylamine. Usually this reduction has been carried out using Raney nickel and hydrogen gas, but other common reduction techniques are readily applicable.

The nitrodiphenylamines and aminodiphenylamines are difficult to purify and some even decompose on standing. In most instances partially purified nitrodiphenylamines and aminodiphenylamines have been reacted to obtain the products of the invention which are generally more easily purified.

As noted previously, the compounds of the invention are as a class active as anti-microbial agents, although some are more active than others. The anti-microbial activity has been determined by a variation of the original agar-plate diffusion method of Vincent and Vincent. The culture media employed are designed to meet the minimum essential requirements for the growth of the various test organisms. They are based on the synthetic glucose-salts medium of Davis and Mingioli (DG-agar). The table below gives the medium used for each of the test organisms:

| Organism: | Medium |
|---|---|
| (1) *Staphylococcus aureus* | DGY |
| (2) *Bacillus subtilus* | DGA |
| (3) *Pseudomonas aeruginosa* | DG |
| (4) *Escherichia coli* | DG |
| (5) *Streptococcus sp.* | (1) |
| (6) *Aspergillus niger* | DG |
| (7) *Candida albicans* | DGY |

[1] Strains isolated from dental caries in rats or hamsters at the National Institute of Dental Health and grown in PFY or APT agar.

The tests are carried out quantitatively by placing 4 µl. aliquots of 1 percent, 0.1 percent and 0.01 percent solution of the test chemicals on 6.5 mm. paper discs to give 40, 4.0 and 0.4 µg. per disc, respectively.

For the first part of the tests, in serum-free media, the same culture media are used as described above. For the second part of the tests, all test organisms except number 5, are grown in PGY agar supplemented with 10 percent horse serum. Organism number 5 is grown in APT agar supplemented with 10 percent horse serum in a desiccator in 10 percent $CO_2$ in air. The others (1, 2, 3, 4, 6 and 7) are grown in air. Plates were incubated at 30° C. for 24 hours for the bacteria and *C. albicans* and 48 hours for *A. niger*. The diameters of the zones of inhibition are measured, and log $m$ was plotted against $X^2$, where $m$ is the weight of test compound on the disc in µg. and X is the diameter of the zone of inhibition in mm.

The culture media used in the foregoing tests are as follows:

| DG: | G. |
|---|---|
| $K_2HPO_4$ | 7.0 |
| $NaH_2PO_4 \cdot H_2O$ | 2.3 |
| $MgSO_4 \cdot 7H_2O$ | 0.1 |
| $(NH_4)_2SO_4$ | 1.0 |
| $CaCl_2 \cdot 2H_2O$ | 0.04 |
| $FeSO_4 \cdot 7H_2O$ | 0.01 |
| Dextrose | 2.0 |
| PGY: | |
| NaCl | 16.0 |
| KCl | 0.80 |
| $MgSO_4 \cdot 7H_2O$ | 0.308 |
| $CaCl_2 \cdot 2H_2O$ | 0.032 |
| $Na_2HPO_4 \cdot 7H_2O$ | 0.58 |
| $KH_2PO_4$ | 0.30 |
| Phenol Red | 0.0024 |

Leading references to the method used are: Vincent, J. G., and Vincent, Helen W., Proc. Soc. Exptl. Biol. Med. 55:162–164, 1944, and Davis, B. D., and Mingioli, E. S., Jour. Bact. 66:129–136, 1953.

Preferred anti-microbial agents of the invention include 2,3-dimethyl-2'-trifluoromethylsulfonamidodiphenylamine,
2,3-dichloro-2'-trifluoromethylsulfonamidodiphenylamine,
2-trifluoromethylsulfonamidodiphenylamine,
2-difluoromethylsulfonamidodiphenylamine,
5-chloro-2-trifluoromethylsulfonamidodiphenylamine,
4'-chloro-2-trifluoromethylsulfonamidodiphenylamine,
2-chloromethylsulfonamidodiphenylamine and
5-chloro-2-trifluoromethylsulfonamido-2'-ethoxycarbonyldiphenylamine.

These compounds are presently preferred because of their broader spectrum of activity (affecting at least four of the test organisms) and higher degree of activity. Such anti-microbial agents are useful for disinfecting and sterilizing medical and dental equipment as components of disinfecting solutions.

Many of the compounds of the present invention are also active anti-inflammatory agents. The anti-inflammatory activity can be conveniently demonstrated using assays designed to test the ability of these compounds to antagonize the local edema which is a characteristic of the anti-inflammatory response (rat foot edema test) and to inhibit the onset of the erythematous manifestation of inflammation (guinea pig erythema test).

The edema test is performed on adult female rats. One group of 10 rats serves as non-medicated controls, while another group of 10 rats receives the test compound at various times prior to the induction of the edema, usually 15 minutes, one hour and/or 18 hours. The test compound is administered as a suspension in 4 percent aqueous solution of acacia. Edema is induced by the plantar injection of 0.5 percent carrageenin (0.1 ml./foot) into the right hind foot. The left hind foot receives a like volume of 0.9 percent saline solution. One hour later, the volume of each hind foot is determined plethysmographically. The edema is expressed as the increase in the volume of the edemogen injected foot (volume of the "edemogen foot" less the volume of the "saline" foot). The percent inhibition is calculated by dividing the mean increase in the edema of the edemogen foot of the medicated group by the mean increase in the non-medicated group, multiplied by 100. An active dose is that giving a statistically significant inhibition of the induced edema, usually about 30–35 percent inhibition.

The erythema test is performed on adult, albino guinea pigs of either sex weighing 400–600 g. Hair is removed from the abdomen of the animals by a depilatory mixture the afternoon of the day prior to the day on which they are to be used. One group of 5 animals serves as non-medicated controls, while another group of 5 receives the test compound 30 minutes prior to direct exposure to ultraviolet light. For induction of erythema, the animal is restrained on a small animal board. Three circular sections (6.8 mm. in diameter) of the ventro-lateral abdominal area of the animal are then exposed to a controlled amount of ultraviolet radiation. Two hours after exposure, the erythema is scored 0–5 on the basis of its intensity and completeness (full or partial circles). The maximal score per animal is 15. The percent inhibition is calculated on the basis of the mean score for the medicated group versus the nonmedicated group. An active dose is taken to be that giving a statistically significant inhibition of the induced erythema, usually 35–40 percent inhibition. Modifications of this test include variation in the time and method of drug administration.

Leading references to this method are:

(1) Wilhelmi, Schweiz. Med. Wschr. 79:557, 1949, and
(2) Winder et al., Arch. Int. Pharmacodyn 116:261, 1958.

Preferred compounds of the invention with respect to anti-inflammatory activity are:

2-trifluoromethylsulfonamidodiphenylamine
triethylammonium 3-trifluoromethylsulfonamidodiphenylamine
triethylammonium 4-trifluoromethylsulfonamidodiphenylamine
4'-chloro-2-trifluoromethylsulfonamidodiphenylamine
4'-methyl-3-trifluoromethylsulfonamidodiphenylamine
triethylammonium 3'-methyl-3-trifluoromethylsulfonamidodiphenylamine
2-trifluoromethylsulfonamidomethyldiphenylamine
triethylammonium 2-methyl-5-trifluoromethylsulfonamidodiphenylamine The compounds are preferably administered orally as anti-inflammatory agents but other known methods of administration are contemplated as well, e.g. dermatomucosally (for example dermally, rectally, and the like) and parenterally, for example by subcutaneous injection, intramuscular injection, intravenous injection and the like. Ocular administration is als included. Dosages ordinarily fall within the range of about 1 to 500 mg./kg. of body weight of the mammal to be treated although oral dosages are not usually above 100 mg./kg. and injection dosages are not usually above 50 mg./kg. Suitable forms for oral administration include liquids (such as four percent acacia suspensions), tablets (which may contain anhydrous lactose microcrystalline cellulose, modified starch, calcium stearate and talc, as well as other conventional compounding agents together with the active anti-inflammatory agent) and capsules. Suitable carriers for topical application include creams, gels, tapes and the like. Liquid formulations, such as solutions or suspensions of the active ingredient in inert carriers, are contemplated for dosage by injection.

Various compounds of the invention have also been found by animal tests to be active analgesic agents.

The herbicidal activity of compounds of the invention has been evaluated using experimental plantings, and a number of compounds of the invention have been found to be active herbicides.

The following examples are given for the purpose of further illustrating the procedures of the present invention, but are not intended, in any way, to be limiting on the scope thereof. Thus, while the majority of the examples relate to perfluoromethanesulfonamides, other perfluorocarbon groups can be substituted in place thereof. Also, although the examples relate for the most part to compounds in the acid form (that is having a hydrogen atom bonded to the sulfonamido nitrogen), and a few to the triethylammonium salt, it is understood that the other salts of the invention are also easily prepared and are likewise contemplated. Such salts, which have a cation bonded to the sulfonamido nitrogen, generally have the utility areas of the corresponding acid-form compounds.

All melting points in the examples are uncorrected.

EXAMPLE 1

The method generally used for the preparation of the 2- and 4-aminodiphenylamine precursors is illustrated in this example.

A mixture of 3-trifluoromethylaniline (80.5 g., 0.5 mole), 2-chloronitrobenzene (74.0 g., 0.5 mole), sodium acetate (61.5 g., 0.75 mole), copper powder (10 g.), cuprous chloride (90.5 g.) and nitrobenzene (300 ml.) is heated at 200° C. for 22 hours. The thick green paste is steam distilled to remove some impurities, then the residue is extracted with dichloromethane dried over magnesium sulfate, filtered and the solvent removed in vacuo. The infrared spectrum of this oil is consistent with the structure of desired 2-nitro-3'-trifluoromethyldiphenylamine. This product is reduced with Raney nickel suspended in ethanol and hydrogen gas. The reaction mixture is filtered, the solvent is removed in vacuo and the product, 2-amino-3'-trifluoromethyldiphenylamine, is recrystallized from a benzene-hexane mixture to yield a solid, M.P. 75–80° C. The infrared spectrum of this solid indicates that it is the desired product.

Example 2

This example describes the method generally used for the preparation of the 3-aminodiphenylamine precursors.

In a round-bottomed flask is placed bromobenzene (172.8 g., 1.1 moles), 3-nitroacetanilide (100 g., 0.555 mole), copper powder (5.0 g.), potassium iodide (2.5 g.), potassium carbonate (76.5 g., 0.55 mole) and a pinch of cuprous chloride. This mixture is stirred for 4 hours at 170° C., then steam distilled to remove volatile impurities for one and one-half hours. The residue is extracted with dichloromethane. The dichloromethane fraction is evaporated in vacuo to yield a dark oil. This oil is treated with a solution of ethanol (150 ml.), water (150 ml.) and concentrated hydrochloric acid (150 ml.) and heated on a steam bath for sixteen hours. This mixture is cooled to give a red solid which is separated by filtration. Dilution of the filtrate with water precipitates an additional fraction of red solid. Recrystallization of this product from ethanol gives 3-anilinonitrobenzene, M.P. 106–108° C.

Example 3

This example is illustrative of an alternative method for the synthesis of the 3-aminodiphenylamines.

A mixture of 3-trifluoromethylacetanilide (40.8 g., 0.2 mole), 3-bromonitrobenzene (42.5 g., 0.21 mole), potassium carbonate (27.7 g., 0.2 mole), copper powder (4 g.), potassium iodide (2 g.) and cuprous chloride (0.1 g.) is heated at 180° C. for 22 hours. The resultant mixture is steam-distilled to remove volatile impurities. The residue is heated with ethanol (250 ml.), water (100 ml.), and potassium hydroxide (28 g., 0.5 mole) for three hours. The mixture is then steam-distilled, and the residue extracted with methylene chloride, dried over magnesium sulfate, filtered and the solvent removed in vacuo to give a yellow-brown product. The infrared spectrum of this product is consistent with the structure of 3'-trifluoromethyl-3-nitrodiphenylamine. This product is reduced with Raney nickel in ethanol and hydrogen gas. The reaction mixture is filtered, the solvent is removed in vacuo and the product is column chromatographed on an activated silica to give an oil whose infrared spectrum indicates it is 3'-trifluoromethyl-3-aminodiphenylamine.

Example 4

This example is illustrative of an alternative method for the synthesis of the 2- and 4-aminodiphenylamines.

To a mixture of sodium hydride in mineral oil (9.28 g., 0.2 mole) at 52 percent and hexamethylphosphoramide (100 ml.) is added slowly 2,3-dichloroaniline (32.2 g., 0.2 mole) in hexamethylphosphoramide (50 ml.) at 35–45° C. under a nitrogen atmosphere. Next 2-chloronitrobenzene (31.5 g., 0.2 mole) in hexamethylphosphoramide (50 ml.) is added to the reaction mixture. The mixture is heated to 130° C. and maintained there for seventeen hours. The mixture is steam distilled to remove volatile impurities, and extracted repeatedly with dichloromethane, the extracts are dried over magnesium sulfate, filtered and the solvent removed in vacuo. The dark residue is digested in 95 percent ethanol (100 ml.), then filtered to give a dark powder. The infrared spectrum of this product is consistent with the structure of 2,3-dichloro-2'-nitrodiphenylamine, M.P. 110–120° C. This product, 14.4 g., 0.05 mole is slurried in methanol (100 ml.) and reduced with Raney nickel and hydrogen gas. The solvent is removed in vacuo, and the infrared spectrum of the product indicates it is 2,3-dichloro-2'-aminodiphenylamine. The product is purified by column chromatography on neutral alumina, being eluted rapidly with trichloroethylene.

Example 5

The following are illustrative of the preparation of the compounds of the invention.

Part of the product of Example 1, 2-amino-3'-trifluoromethyldiphenylamine (25.2 g., 0.10 mole), and triethylamine (15 ml.) and dichloromethane are stirred and cooled to maintain the temperature below 20° C. while adding trifluoromethanesulfonic anhydride (16.9 ml., 0.10 mole), then stirring is continued for one hour. The reaction mixture is washed with 10 percent hydrochloric acid before removing the solvent (in vacuo) and dissolving the residue in 10 percent sodium hydroxide. This basic solution is steam distilled to remove volatile impurities, then treated with decolorizing charcoal, and reacidified to give a reddish material. This material is extracted with chloroform, dried over magnesium sulfate, filtered and the solvent removed in vacuo. The reddish solid residue is then chromatographed on acid alumina. The early fractions, eluted with trichloroethylene, yield a tan solid when evaporated. This solid is recrystallized twice from a benzene-hexane mixture to yield white needles of 3'-trifluoromethyl - 2 - trifluoromethylsulfonamidodiphenylamine, M.P. 120–121° C.

Analysis.—Calcd. for $C_{20}H_{23}F_3N_3O_2S$ (percent): C, 43.9; H, 2.6. Found (percent): C, 44.1; T, 2.8.

Example 6

Crude 2-methyl-3-trifluoromethylsulfonamidodiphenylamine (2.0 g., 6.0 mole), prepared from the appropriate intermediate compounds according to the procedure of Example 5 is dissolved in diethyl ether, the solution is filtered to remove solid impurities and excess triethylamine is added. The solvent and excess triethylamine are removed in vacuo, and the tan solid obtained is recrystallized twice from an isopropanol:isopropyl ether mixture to give a tan power, triethylammonium 2'-methyl-3-trifluoromethylsulfonamidodiphenylamine, M.P. 108–110.5° C.

Analysis.—Calcd. for $C_{20}H_{28}F_3N_3O_2S$ (percent): C, 55.7; H, 6.5; N, 9.7. Found (percent): C, 56.1; H, 6.5; N, 9.7.

Example 7

4-chloro-2-nitroaniline (100 g., 0.58 mole) in triethylamine (250 ml.) is reacted with trifluoromethanesulfonyl fluoride (88.5 g., 0.58 mole), in a pressure reactor at 90° C. for 20 hours. The solution is made basic with concentrated sodium hydroxide solution, then steam distilled. The residue is treated with decolorizing charcoal, filtered, then acidified with concentrated hydrochloric acid and extracted twice with 250 ml. portions of chloroform. The extracts are dried over magnesium sulfate, filtered and evaporated in vacuo to obtain product, 4-chloro-2-nitrotrifluoromethanesulfonanilide. Part of this compound (20 g., 0.066 mole) is dissolved in ethanol, placed under a nitrogen atmosphere and treated with Raney nickel, then reduced under hydrogen gas. The mixture is activated with sulfur, filtered and the filtrate is evaporated in vacuo. An infrared spectrum of the product is consistent with the assigned structure, 2-amino-4-chlorotrifluoromethylsulfonanilide.

2-amino-4-chlorotrifluoromethylsulfonanilide (17.4 g., (0.063 mole) is mixed with potassium hydroxide solution (0.063 equivalent) and the solution is evaporated in vacuo to give the potassium salt (19.2 g., 0.061 mole), which is placed in dimethylformamide (20 ml.) with potassium 2-bromobenzoate (14.6 g., 0.061 mole), N-ethylmorpholine (7.05 g., 0.061 mole) and cupric bromide (1 g.) and heated at 145° C. for 3.5 hours. The mixture is cooled and poured into water (500 ml.), and 10 percent sodium hydroxide solution (75 ml.) is added. The mixture is treated with decolorizing charcoal, filtered and acidified with concentrated hydrochloric acid. The solution is extracted with chloroform, dried over magnesium sulfate, filtered and evaporated in vacuo. This purification is repeated, then the product is recrystallized from toluene thrice. The product is 5-chloro-2-trifluoromethylsulfonamidodiphenylamine, M.P. 180.5–183° C.

5 - chloro - 2 - trifluoromethylsulfonamidodiphenylamine (17.9 g., 0.045 mole) is esterified in ethanol (125 ml.) by heating at reflux temperature with hydrochloric acid (1 ml.) overnight, then adding sulfuric acid (2 ml.) and heating at reflux temperature for one day. The mixture is treated with decolorizing charcoal, filtered and evaporated to dryness in vacuo. The product is recrystallized from ethanol-water twice and benzene-petroleum ether twice, then benzene once to give 5-chloro-2-trifluoromethylsulfonamido-2'-(ethoxycarbonyl) - diphenylamine, M.P. 114.5–116.5° C.

Analysis.—Calcd. for $C_{16}H_{14}ClF_3N_2O_4S$ (percent): C, 45.4; H, 3.3; N, 6.5. Found (percent): C, 45.4; H, 3.3; N, 6.5.

The following compounds are prepared according to the methods illustrated in the foregoing examples.

| Example No. | Compound | Melting point (in ° C.) |
|---|---|---|
| 8 | 2-trifluoromethylsulfonamidodiphenylamine | 77.5–79 |
| 9 | 2,3-dimethyl-2'-trifluoromethylsulfonamidodiphenylamine | 76–78 |
| 10 | 2,3-dichloro-2'-trifluoromethylsulfonamidodiphenylamine | 70–72.5 |
| 11 | 4'-chloro-2-trifluoromethylsulfonamidodiphenylamine | 121–122.5 |
| 12 | 3'-chloro-2-trifluoromethylsulfonamidodiphenylamine | 112.5–114.5 |
| 13 | Triethylammonium 2'-chloro-2-trifluoromethylsulfonamidodiphenylamine | 93–95.5 |
| 14 | 5-chloro-2-trifluoromethylsulfonamidodiphenylamine | 116.5–117.5 |
| 15 | 2-(trifluoromethylsulfonamido)methyldiphenylamine | 72–75 |
| 16 | 2-chloromethylsulfonamidodiphenylamine | 106.5–108 |
| 17 | 2-fluoromethylsulfonamidodiphenylamine | 93.5–95.5 |
| 18 | 2-perfluorobutylsulfonamidodiphenylamine | 70–71.5 |
| 19 | 2-difluoromethylsulfonamidodiphenylamine | 58–60 |
| 20 | Triethylammonium 3-trifluoromethylsulfonamidodiphenylamine | 106–110 |
| 21 | Triethylammonium 4-trifluoromethylsulfonamidodiphenylamine | 98–111 |
| 22 | 3'-trifluoromethyl-3-trifluoromethylsulfonamidodiphenylamine | 103.5–105.5 |
| 23 | 2,3-dimethyl-3'-trifluoromethylsulfonamidodiphenylamine | 95–96.5 |
| 24 | 4'-methyl-3-trifluoromethylsulfonamidodiphenylamine | 80–82 |
| 25 | Triethylammonium 3'-methyl-3-trifluoromethylsulfonamidodiphenylamine | 91–93 |
| 26 | Triethylammonium 2-methyl-5-trifluoromethylsulfonamidodiphenylamine | [1] 117–120 |

[1] Decomposes.

What is claimed is:
1. A method for combatting inflammatory processes in a mammalian animal which comprises administering to said animal a dose effective for the control of the inflammatory processes but less than the toxic amount of a compound of the formula:

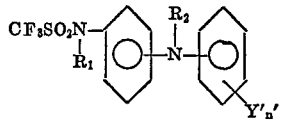

wherein $R_1$ is hydrogen or triethyl ammonium, $R_2$ is hydrogen or lower alkyl, $Y^1$ is lower alkyl, or halogen and $n'$ is 0 or 1.

2. A methyl according to claim 1 wherein $n'$ is 0.
3. A method according to claim 1 wherein $R_2$ is hydrogen.
4. A method according to claim 1 wherein the compound is 2-trifluoromethylsulfonamidodiphenylamine.
5. A method according to claim 1 wherein the compound is triethylammonium 3-trifluoromethylsulfonamidodiphenylamine.
6. A method according to claim 1 wherein the compound is triethylammonium 4-trifluoromethylsulfonamidodiphenylamine.
7. A method according to claim 1 wherein the compound is 4'-chloro-2-trifluoromethylsulfonamidodiphenylamine.
8. A method according to claim 1 wherein the compound is 4'-methyl-3-trifluoromethylsulfonamidodiphenylamine.
9. A method according to claim 1 wherein the compound is triethylammonium 3'-methyl-3-trifluoromethylsulfonamidodiphenylamine.
10. A method according to claim 1 wherein the compound is 2-trifluoromethylsulfonamidomethyldiphenylamine.

References Cited
UNITED STATES PATENTS
| | | | |
|---|---|---|---|
| 3,647,874 | 3/1972 | Gerster | 424—321 |
| 3,661,990 | 5/1972 | Harrington | 424—321 |
| 3,689,553 | 9/1972 | Moore et al. | 424—321 |

FOREIGN PATENTS
856,452  12/1960  Great Britain.

STANLEY J. FRIEDMAN, Primary Examiner

U.S. Cl. X.R.

260—566 A, 566 F

UNITED STATES PATENT OFFICE
CERTIFICATE OF CORRECTION

Patent No. 3,755,605    Dated August 28, 1973

Inventor(s) George G.I. Moore and Joseph Kenneth Harrington

It is certified that error appears in the above-identified patent and that said Letters Patent are hereby corrected as shown below:

Column 1, line 17, following "are" insert --also--

Column 3, line 30, " 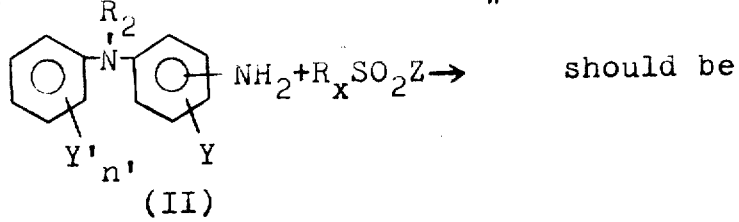 should be

-- 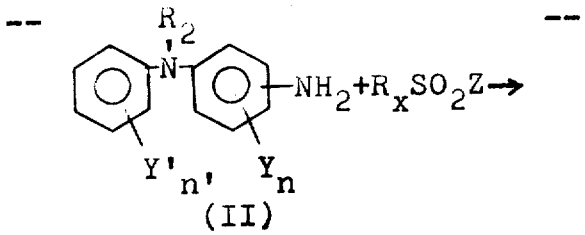 --

Column 9, line 10, "$C_{20}H_{28}F_3N_3O_2S$" should be --$C_{14}H_{10}F_6N_2O_2S$--

Column 9, line 11, "T," should be --H,--

Column 9, line 14, "2-" should be --2'- --

Column 9, line 44, "activated" should be --deactivated--

Column 10, line 55, "methyl" should be --method--

Signed and sealed this 4th day of June 1974.

(SEAL)
Attest:

EDWARD M. FLETCHER, JR.
Attesting Officer

C. MARSHALL DANN
Commissioner of Patents